April 18, 1939.   N. H. NELSON   2,155,147
AUTOMOTIVE VEHICLE
Filed May 20, 1935   3 Sheets-Sheet 2
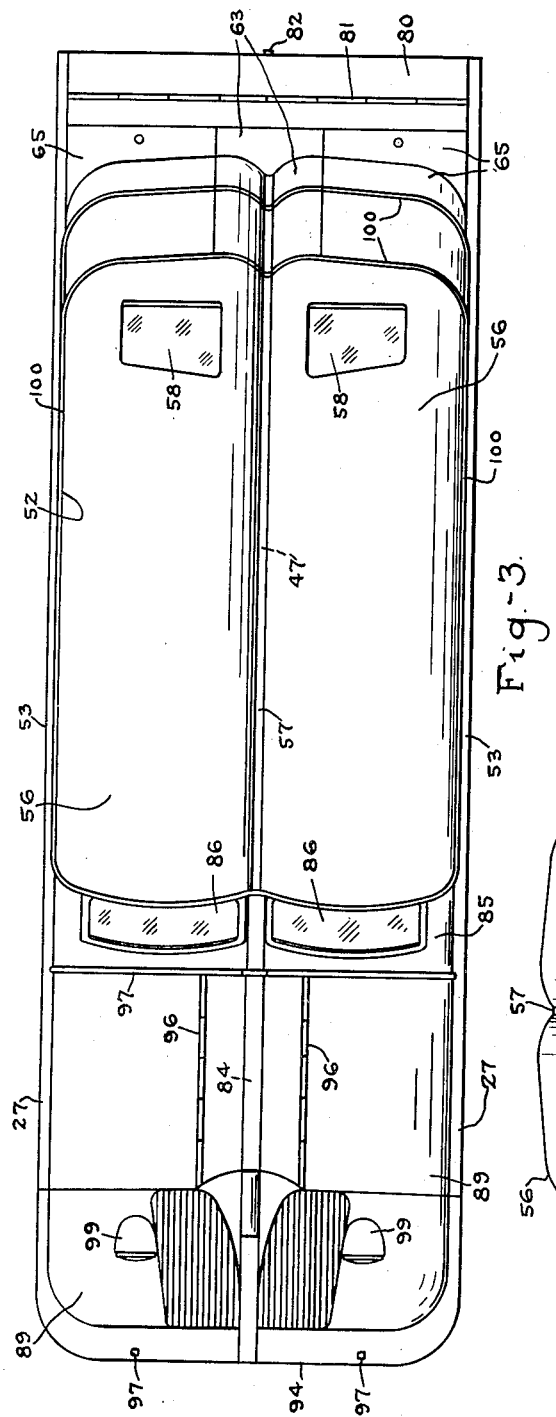
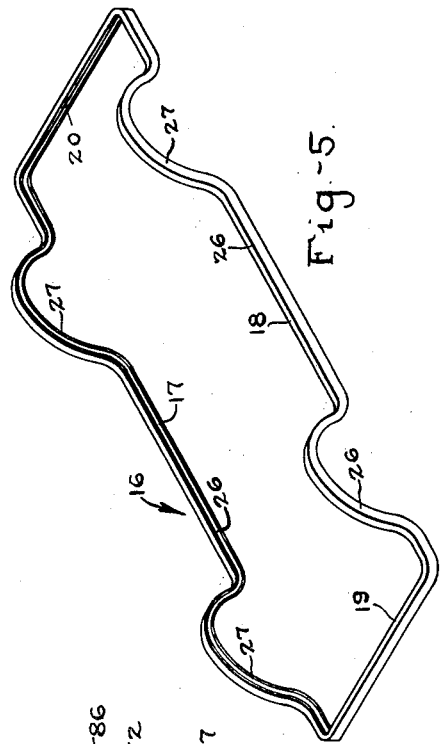
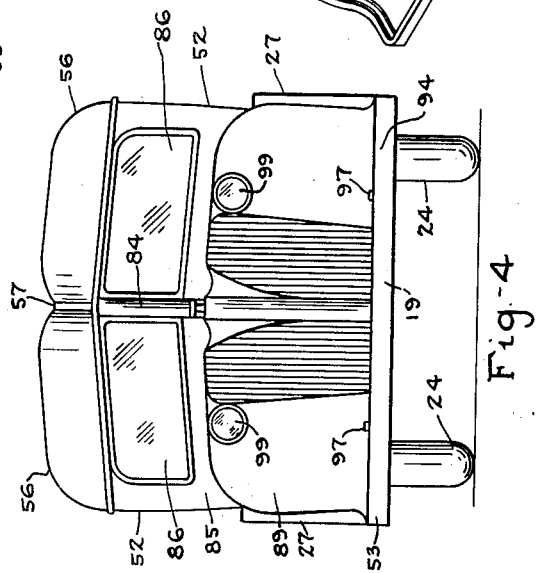
Inventor:
Nels H. Nelson.
By G. H. Braddock
Attorney April 18, 1939.  N. H. NELSON  2,155,147
AUTOMOTIVE VEHICLE
Filed May 20, 1935   3 Sheets-Sheet 3

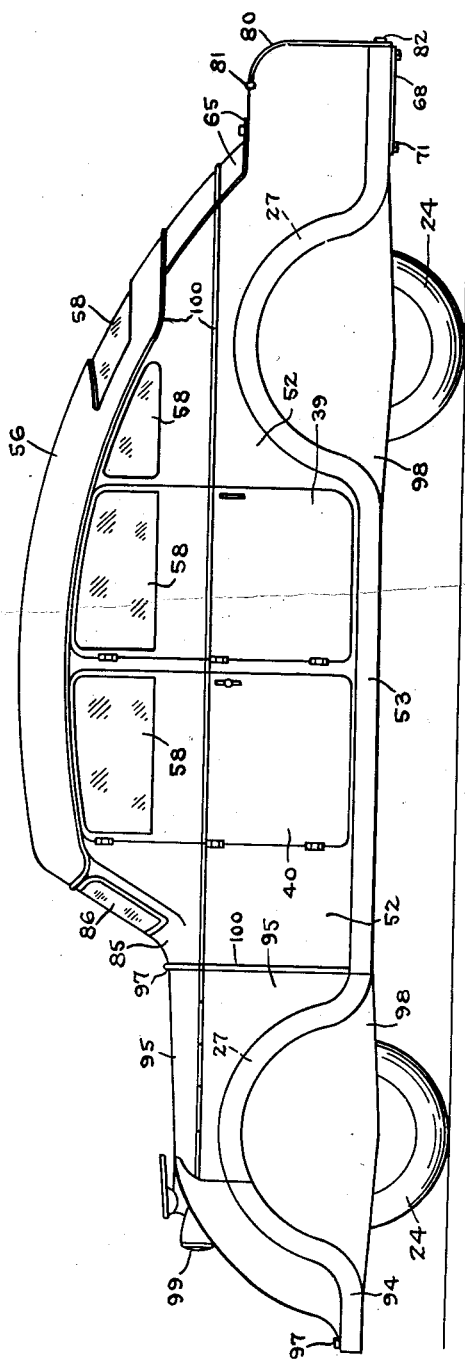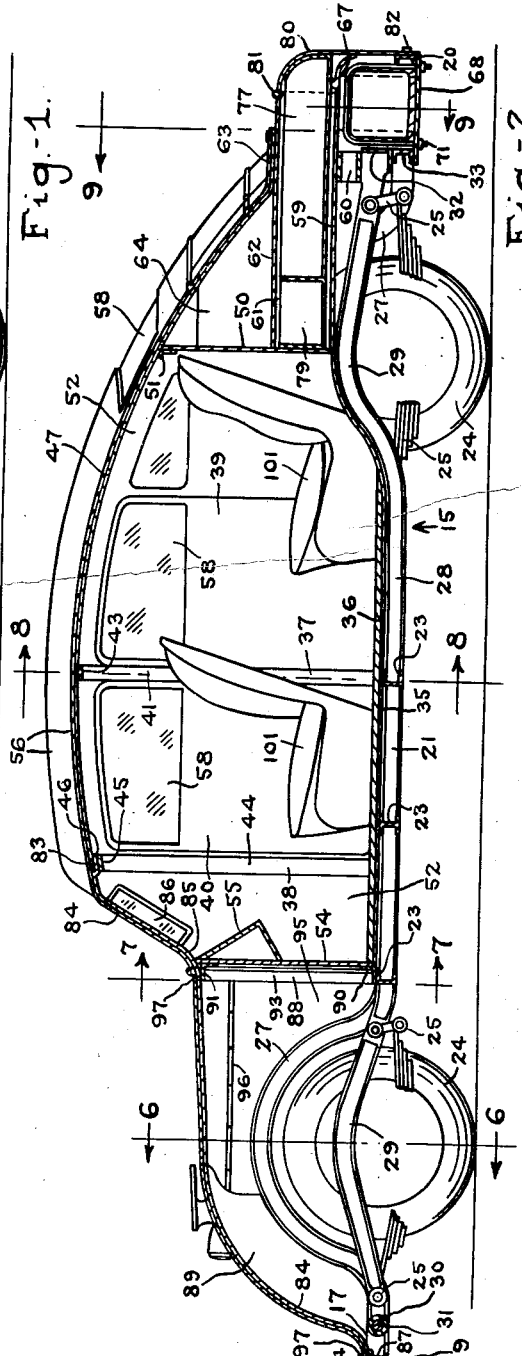

Inventor:
Nels H. Nelson
By G. H. Braddock
Attorney

Patented Apr. 18, 1939

2,155,147

UNITED STATES PATENT OFFICE 2,155,147

AUTOMOTIVE VEHICLE

Nels H. Nelson, Minneapolis, Minn.

Application May 20, 1935, Serial No. 22,377

6 Claims. (Cl. 296—137)

This invention has relation to an automotive vehicle, and an object of the invention is to provide an automotive vehicle body of new and improved structure and design.

A further object is to provide an automotive vehicle wherein will be incorporated various improved features and characteristics of construction novel both as individual entities of the automotive vehicle and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of an automotive vehicle made according to the invention;

Fig. 2 is a vertical, longitudinal, central sectional view of the automotive vehicle;

Fig. 3 is a plan view;

Fig. 4 is a front elevational view;

Fig. 5 is a perspective view, on a reduced scale, of a sub-frame of the automotive vehicle removed therefrom;

Figure 6:
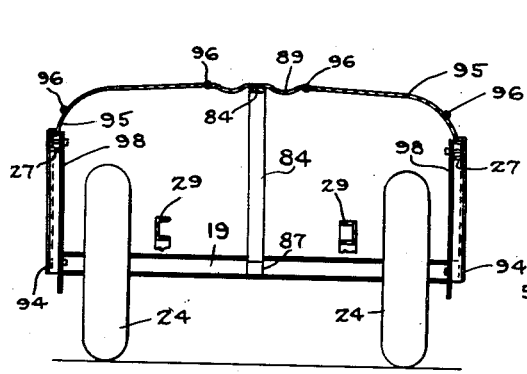
Fig. 6 is a transverse sectional view, taken as on line 6—6 in Fig. 2.
Figure 7:
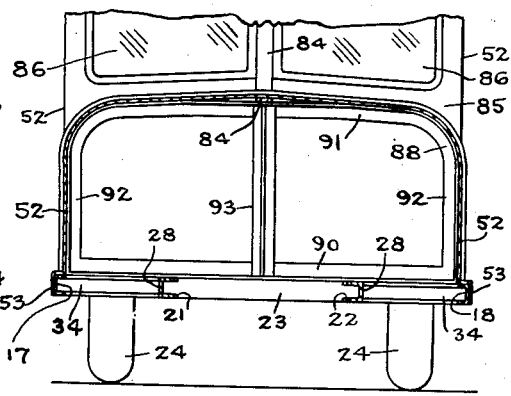
Fig. 7 is a transverse sectional view, taken as on line 7—7 in Fig. 2.
Figure 8:
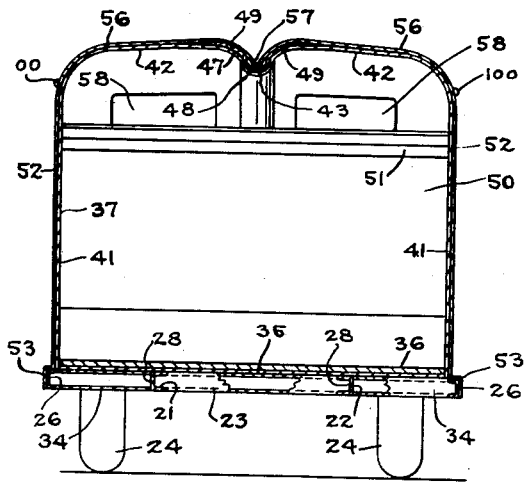
Fig. 8 is a transverse sectional view, taken as on line 8—8 in Fig. 2.
Figures 10, 12, 13, 14:
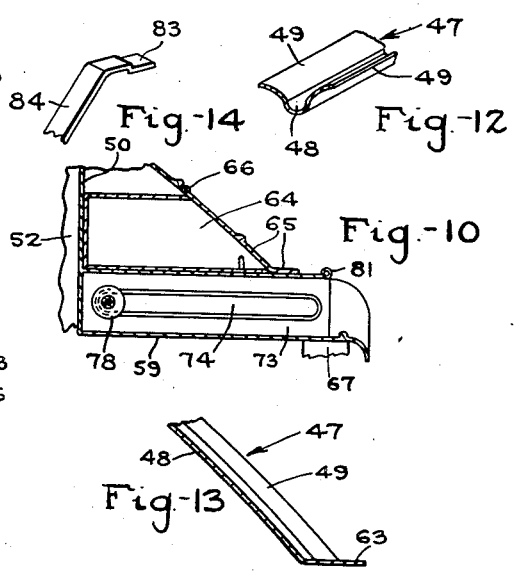
Fig. 10 is a detail sectional view, taken as on line 10—10 in Fig. 9.
Fig. 12 is a view detailing features of the center tie bar of the automotive vehicle, disclosing a fragment of said tie bar in perspective.
Fig. 13 is a view detailing additional features of the center tie bar, disclosing the rear end portion of said tie bar in longitudinal section.
Fig. 14 is a view detailing the portion of the forward tie bar which is associated with the center tie bar.
Figure 9:
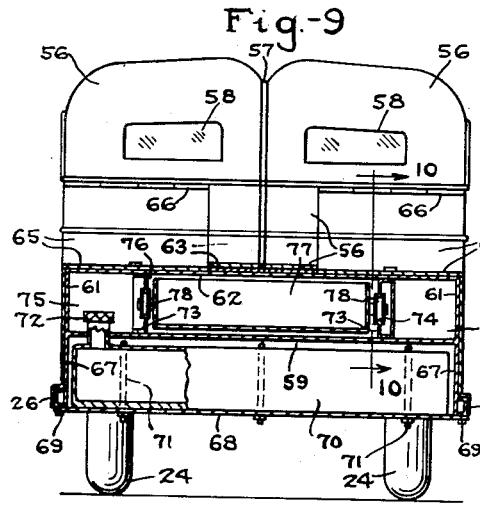
Fig. 9 is a transverse sectional view taken as on line 9—9 in Fig. 2.
Figure 11:
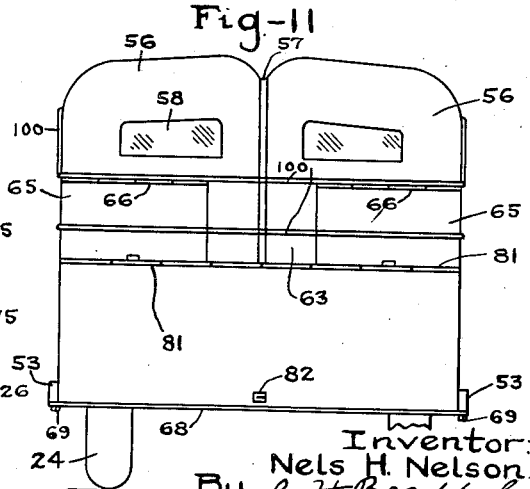
Fig. 11 is a rear elevational view of the automotive vehicle.

While the features and characteristics of the invention have been illustrated, and will be described, as incorporated in an automotive vehicle more especially adapted for use as a pleasure vehicle, attention is called to the fact that many, and perhaps all, of said features and characteristics may be applicable to other types of vehicles.

With respect to the drawings and the numerals of reference thereon, a metallic frame for the vehicle is denoted generally at 15, and a metallic subframe is represented generally at 16. The subframe 16 surrounds the frame 15 and extends approximately the full length and the full width of the vehicle.

As disclosed more clearly in Fig. 5, the subframe 16 is desirably a continuous, rectilinear channel entity having its flanges extending inwardly, including spaced apart longitudinal subframe members 17 and 18 at the opposite sides of the vehicle and spaced apart transverse subframe members 19 and 20 at the opposite ends of said vehicle. Said subframe 16 can consist of a single, continuous piece of channel metal, or of several separate pieces of channel metal suitably connected, as by welding or riveting.

The frame 15 includes longitudinally extending, desirably channel members 21 and 22 which are between the longitudinal members 17 and 18, and are spaced from said members 17 and 18, as well as from each other. Tie beams 23, of I-beam and channel conformation, between the members 21 and 22, fix said members relatively to each other. The opposite end portions of the tie beams 23 are secured in any convenient manner, as by welding or riveting, to said members 21 and 22. As shown, the flanges of the channel members 21 and 22 also extend inwardly.

Front and rear wheels of the vehicle are indicated 24. The members 17 and 18 are at the outer sides of the wheels, and the members 21 and 22 are at the inner sides of said wheels. Mechanisms for suitably mounting the vehicle upon its wheels, denoted generally at 25, are attached to the longitudinal members 21 and 22.

The longitudinal members 17 and 18 include horizontal portions 26 thereof which are as shown at about the elevation of the wheels axles, and upwardly curved portions 27 which are at elevation just above the wheels and their tires, to offer no interference to removal of said wheels and/or tires when this is necessary. Each horizontal portion 26 is between curved portions 27.

The longitudinal members 21 and 22 include horizontal portions 28 at the elevation of the horizontal portions 26, and slightly upwardly curved portions 29 adjacent the wheels. Each horizontal portion 28 is between curved portions 29, and said portions 29 clear the wheel axles.

The opposite end portions of the longitudinal members 21 and 22 terminate in spaced relation to the transverse members 19 and 20. At the front of the vehicle, a tie rod 30 extends from the member 17 to the member 18 and through forward ends of the members 21 and 22, and spacers 31 are between all of the members 17, 21 and 21, 22 and 22, 18. At the rear of the vehicle, the rearward ends of the longitudinal members 21 and 22 are somewhat above the elevation of the rearward portions of the longitudinal members 17 and 18 and the transverse member 20. As disclosed, said rearward ends of the longitudinal members 21 and 22 are connected together by an L-bar 32 welded or riveted to said members 21 and 22, and in turn the lower surface of the L-bar 32 is welded or riveted to a transverse channel piece 33 having its opposite ends welded or riveted to rearward portions of the longitudinal members 17, 18. Also, the longitudinal members 21 and 22 are connected to the longitudinal members 17 and 18, respectively, by tie beams 34 between and having their opposite end secured, as by welding or riveting, to the members 17, 21 and 21, 22 and 22, 18 at spaced locations intermediate the ends thereof.

A metal floor plate for the vehicle is denoted 35. Said floor plate 35 is supported by and welded, riveted, or otherwise attached, to the members 21, 22, 23 and 34, and is coextensive with the passenger space of the vehicle body. That is, the floor plate 35 extends lengthwise of the vehicle body from dash to rear wall, and crosswise from side wall to side wall of said vehicle body. A wood floor 36 is over the portion of the metal floor 35 at location occupied by passengers of the vehicle.

Strengthening and reinforcing, desirably metallic members for the side walls and the top wall of the vehicle body are denoted 37 and 38, respectively. The member 37 in the disclosure as made is in front of the rearward doors 39 and the member 38 is in front of the forward doors 40. The member 37 is of general inverted U-shape, the legs 41 of said member constituting ribs for strengthening and reinforcing the side walls of the vehicle body, and the base 42 of said member constituting a rib for strengthening and reinforcing the top wall of said vehicle body. The midlength of the base 42 is curved downwardly to provide an upwardly opening saddle or groove 43 at the midwidth of the top of the car body. The member 38 is of about the same general construction as the member 37, including legs 44 and base 45 with saddle or groove 46, but the legs 44 are slightly shorter than the legs 41. The legs 41 and 44 of the members 37 and 38, respectively, are welded to the subframe 16 and to the metal floor plate.

A center tie bar 47 lies in the saddles or grooves 43 and 46 to extend longitudinally of the top of the car body at the midwidth thereof, and said center tie bar is suitably connected, as by welding or riveting, to the members 37 and 38. The center tie bar consists of a metallic strip or curvilinear configuration at its midwidth 48 to rest upon and fit the saddles or grooves 43 and 46, and adjacent the curvilinear portion 48, the side or edge portions 49 of said center tie bar are shaped to rest upon similarly shaped portions of the saddles or grooves 43 and 46. The curvilinear portion 48 is of length to provide a saddle or groove extending from the front of the top of the vehicle body rearwardly to a portion of said top below the elevation of either saddle or groove 43 or 46, the center tie bar 47 being bent or shaped along its length and toward the rear of the vehicle body to conform with the style of body. As disclosed, the rearward portion of the center tie bar curves smoothly downwardly.

A rear wall 50, desirably of metal, for the passenger space of the vehicle, extends across the vehicle body. The lower edge of the rear wall 50 is welded or otherwise connected to the frame 15 and to the metal floor 35, and the upper edge of said rear wall is welded or otherwise connected to a transverse angle bar 51 extending the full width of the vehicle body.

Desirably metallic side walls 52 of the vehicle body are welded or otherwise connected to the members 37 and 38 at the outer sides of said members, as well as to the side edges of the rear wall 50. The lower edge portion of each side wall 52 is shaped about the outer surface of an adjacent side member 17 or 18 of the subframe 16, as indicated at 53, and the shaped portions 53 are desirably welded or otherwise connected to said members 17 and 18. The side walls 52 extend from about the location of the dash 54 to the rear of the vehicle, as will be clear from the drawings. Said dash 54 extends the width of the vehicle body, and the side walls 52 are welded or otherwise connected to the edges of the dash. Numeral 55 denotes a usual instrument board conveniently mounted upon the dash. The doors 39 and 40 are conveniently mounted in the side walls 52, and the vehicle includes windows 58.

The side walls merge into a top wall 56 for the vehicle which is welded or otherwise connected to the bases 42 and 45 and the angle bar 51. The portion of said top wall 56 which crosses the saddle or groove 48 of the center tie bar 47 is shaped downwardly and welded or otherwise connected to said center tie bar, to thus provide a longitudinally extending slot or air passageway 57 along the midwidth of the top of the vehicle body and for a purpose to be set forth. The slot or air passageway 57 is coextensive with the curvilinear portion 48 of the center tie bar.

The vehicle includes a horizontal extension 59 of the metal floor plate 35 rearwardly of the rear wall 50. Said extension 59 rests upon and is welded or otherwise connected to the frame 15 and to a filler member 60 carried by said frame. The extension 59 constitutes the base of a box including side walls 61 surrounded by the side walls of the vehicle and a top wall 62 which is flat as disclosed.

The portion of the top wall 56 just to the rear of the rear wall 50 curves smoothly downwardly, and the rearward end portion of said top wall 56 meets the top wall 62 of the box and is desirably welded or otherwise connected to said top wall 62. The side walls 52 of course merge into the top wall 56 at location rearwardly of the rear wall 50, as well as at location forwardly of said rear wall.

The rear portion 63 of the center tie bar 47 is flat, and the side edges of said portion 63 are flush with and welded or otherwise connected to adjacent portions of the top wall 56. That is, the rearward portion of the center tie bar is between and attached to the side portions of the top wall of the vehicle, and said rearward portion of the center tie bar meets the top wall 62 of the box and desirably terminates flush with the rearward edge of the top wall 56.

The top wall 62 of the box the bottom wall of which is the extension 59, constitutes a shelf housed by the wall 50, the side walls 52 and the rearwardly and downwardly slanting portion of the top wall 56, for supporting drawers, denoted 64, for articles of clothing, foods, etc. The drawers 64 are made accessible through the instrumentality of small doors 65 hinged at 66 in said rearwardly and downwardly slanting portion of the top wall. It is understood that the small doors 65 cover cut out portions in the rearward part of the top wall 56.

The rear extension 59 integrally supports downwardly extending brackets 67 at the sides of said extension 59 and in the vertical planes of the side walls 61, and said brackets terminate flush with the lower surfaces of the members 17 and 18 of the subframe 16. A shelf 68 fits up against the bottoms of the brackets 67 and the lower surfaces of the members 17, 18 and 20, and is suitably fastened as at 69. A gasoline tank 70 is supported by the shelf 68 beneath the extension 59 and to the rear of the members 21 and 22, and U-bolts 71 fasten the tank 70 down against the shelf 68. The gasoline tank includes a cap covered filler opening 72 which extends upwardly through the extension 59.

The rear end of the box defined by the walls 59, 61 and 62 is open, and said box includes vertical partitions 73 each with elongated horizontal slot 74. The partitions 73 divide the box into three compartments, including two outer, smaller compartments 75, and a larger middle compartment 76. The compartment 75 at the right side of the vehicle will desirably carry the usual car battery, which will be properly wired up, and the compartment 75 at the left may carry tools. The compartment 76 will desirably carry a tire box 77 with rollers 78 at the opposite sides thereof ridable in the elongated slots 74. Said compartment 76 is in relatively close proximity to the ground, and the arrangement is such that when the tire box 77 is pulled outwardly to move the rollers 78 to the outer ends of the slots 74, the rearward edge of said tire box will rest upon the ground, thus to reduce the labor required to remove a tire from or replace a tire in the tire box. A compartment 79 at the rear of the tire box may carry tools. The cap covered filler opening 72 for the gasoline tank is as disclosed situated in the left side compartment 75.

A cover 80 for the compartments 75 and 76 and the filler opening 72 is hinged to the top wall 62, as at 81, and means 82 is provided for locking the cover 80 in closed position. When the cover is locked, the compartments 75 and 76 and the gasoline tank are inaccessible.

The rearward end portion 83 of a forward tie bar 84 is fitted between the forward end portion of the curvilinear part 48 of the center tie bar 47 and the saddle or groove 46, and said forward tie bar 84 extends forwardly and downwardly across the upper front 85 of the automotive vehicle. Said upper front 85 is formed as a continuation of the side walls and top wall of the vehicle and includes customary wind shields 86. The side edges of the forward tie bar 84 are welded or otherwise secured to adjacent portions of the upper front 85. The lower forward portion of said upper front 85 is welded or otherwise secured to the upper edge of the dash.

The forward tie bar 84 extends forwardly of the dash to the front of the vehicle, where said forward tie bar is welded or otherwise connected, as at 87, to the transverse member 19 of the subframe 16. As disclosed, the forward tie bar extends in a straight line slanting downwardly slightly in advance of the dash, and said forward tie bar is curved downwardly steeply at location near the front of the vehicle.

A strengthening and reinforcing frame 88 is suitably secured to the forward surface of the dash 54, and cooperates with the portion of the forward tie bar 84 disposed forwardly of said dash to support a hood, denoted 89, for the automotive vehicle. As disclosed, the frame 88 includes a horizontal lower base 90 which is adjacent to the frame 15 and may be welded or otherwise secured thereto, a horizontal upper, curvilinear base 91 which extends the width of the vehicle, uprights 92 at the opposite sides of said vehicle, and an upright 93 at the transverse center of the vehicle, the uprights 92 and 93 having their upper and lower ends, respectively, integrally connected with the upper and lower bases 91 and 90.

The hood 89 is of general curvilinear shape and rests upon the forward tie bar and the frame 88. Said hood extends forwardly to cover the forward portion of the tie bar 84, and the lower side edge and front edge portions of the hood are removably fitted over adjacent portions of the members 17, 18 and 19 of the subframe 16, as indicated at 94. The rearward edges of both the top and sides of the hood lie adjacent the dash 54, over the upper base 91 and the side uprights 92 of the frame 88, and usual closure members 95 are hingedly supported upon the hood as at 96. The elements 91 and 92 provide supporting surfaces for the closure members 95 when in closed position. The hood is desirably removable as a unit from the vehicle, when this is desirable, and to this end means denoted generally at 97 may detachably connect the hood to the vehicle.

As disclosed, the vehicle includes removably attached plates 98 below the curved portions 27 of the subframe and at the outer sides of the wheels. Numeral 99 denotes headlights forwardly of the hood, and 100 represents a series of beads to provide ornamentation. The vehicle includes several additional ornamental features which need not be specifically described.

Attention is called to the fact that the center tie bar 47, together with the mechanisms supporting said center tie bar, provides means extending longitudinally of the top of the vehicle at the midwidth thereof for supporting and rigidly bracing the side walls and top wall of the vehicle. And in turn, all of the supporting and bracing elements for the side walls and top wall of the vehicle cooperate with each other to rigidly and strongly locate the upper portion of the passenger space of the vehicle in fixed relation to the lower portion or floor of said passenger space. In case of an accident causing the vehicle to overturn, the structure as illustrated and described is designed to insure that the upper portion and top wall of the vehicle will not under any ordinary circumstances crumble or cave in. The vehicle body is evidently well braced against sidewise thrusts.

The slot or air passageway 57, extending longitudinally of the top of the vehicle at its midwidth, serves a very useful purpose. As the vehicle travels ahead, a stream of air is caused to pass through the slot or air passageway, at greater or less speed, depending upon the rate of speed at which the vehicle is traveling. Or, stated differently, the slot or air passageway in traveling through the atmosphere, progressively envelops a continuously changing shaft of air which moves along the slot or air passageway, from front to rear thereof, at rate corresponding to the speed of the vehicle. With increase of speed there is increase of the velocity of the air stream through the slot or air passageway 57. The air stream will obviously have considerable tendency toward keeping the top of the vehicle at even keel. Tendency toward sidewise swaying or rocking of the vehicle will be effectually resisted by the force of the air stream traveling along the slot. As the top of the vehicle attempts to move sidewise, the shaft of air in motion relative to the vehicle will evidently function to check the sidewise movement, to a greater or less extent depending upon the speed of travel of the vehicle. As the vehicle speed is increased, to increase the amount of air traveling along the slot or air passageway in unit time, the power of the changing shaft of air to check sidewise movement of the vehicle is also increased due to the increase in velocity of the air which passes the slot, as will be understood. The continuously changing shaft of air which passes the slot or air passageway 57 as the vehicle advances does not only act in a horizontal direction to check sidewise swaying or rocking of the vehicle, but also acts in a vertical direction as well. That is to say, when the different sides of the vehicle have tendency to separately and independently bobble as the wheels travel along the ground, the shaft of air passing the slot or air passageway 57 in effect constitutes an entity pressing vertically and horizontally against the base of the slot or air passageway to check tendency toward swaying or rocking.

A vehicle constructed as illustrated and described utilizes the space across the full width of the vehicle for seating passengers, including the space heretofore ordinarily utilized for passengers, plus the space heretofore occupied by running boards and fenders. A person entering the present vehicle opens one of the doors and steps directly into the vehicle body, no running boards being employed, and the seating space being continuous across the width of the body, which body width is coextensive with the width of the automotive vehicle. Or, stated differently, four persons of ordinary size can occupy each set of seats 101 as shown in Fig. 2 of the drawings, instead of the customary three persons as in pleasure automobiles of commerce.

It is considered that, in addition to the mechanical advantages set forth, division of the vehicle top by provision of a slot or air passageway such as 57 enhances the appearance of the vehicle.

The vehicle will of course include the usual engine, radiator and other appurtenances not required to be illustrated and described herein because forming no part of the present invention.

What is claimed is:

1. In an automotive vehicle, a body including a floor, side walls and a top wall for housing occupants of the vehicle, a frame carrying said floor, a supporting member for said side and top walls extending upwardly from the location of said floor and including uprights at the opposite sides of said body connected with said side walls and a base beneath said top wall and connected therewith, said side walls merging into said top wall, and a metallic strip extending longitudinally of said body at the midwidth thereof, said base including a downwardly shaped portion at its midlength, said metallic strip being connected to and supported by said base and having a curvilinear portion thereof fitted to said downwardly shaped portion, said top wall being connected to and supported by said base, and a portion of said top wall being fitted to said curvilinear portion to provide an air passageway extending longitudinally of the vehicle at its midwidth and at its upper, outer side.

2. In an automotive vehicle, a body including a floor, side walls and a top wall for housing occupants of the vehicle, a frame carrying said floor, a supporting member for said side and top walls extending upwardly from the location of said floor and including uprights at the opposite sides of said body connected with said side walls and a base beneath said top wall and connected therewith, said side walls merging into said top wall, a metallic strip extending longitudinally of said body at the midwidth thereof, said base including a downwardly shaped portion at its midlength, said metallic strip being connected to and supported by said base and having a curvilinear portion thereof fitted to said downwardly shaped portion, said top wall being connected to and supported by said base, and a portion of said top wall being fitted to said curvilinear portion to provide an air passageway extending longitudinally of the vehicle at its midwidth and at its upper, outer side, and rigid front and rear walls for said body connected with and supporting said side and top walls.

3. In an automotive vehicle, a body including a floor, side walls and a top wall for housing occupants of the vehicle, a frame carrying said floor, a supporting member for said side and top walls extending upwardly from the location of said floor and including uprights at the opposite sides of said body adjacent said side walls and a base directly beneath said top wall, and a strip extending longitudinally of said body, said base including a downwardly shaped portion, said strip having a portion thereof curvilinear in cross-section fitted to and supported by said downwardly shaped portion, and said top wall having a portion thereof fitted to and supported by said curvilinear portion to provide an air passageway extending longitudinally of the top wall at the outer side of said vehicle.

4. In an automotive vehicle, a body including a floor, side walls and a top wall for housing occupants of the vehicle, a frame carrying said floor, a supporting member for said side and top walls extending upwardly from the location of said floor and including uprights at the opposite sides of said body connected with said side walls and a base beneath said top wall and connected therewith, said side walls merging into said top wall, a metallic strip extending longitudinally of said body at the midwidth thereof, said base including a downwardly shaped portion at its midlength, said metallic strip being connected to and supported by said base and having a curvilinear portion thereof fitted to said downwardly shaped portion, said top wall being connected to and supported by said base, and a portion of said top wall being fitted to said curvilinear portion to provide an air passageway extending longitudinally of the vehicle at its midwidth and at the outer side of said vehicle, and rigid front and rear walls for said body connected with and supporting said side and top walls.

5. In an automotive vehicle, a body including a floor, side walls and a top wall for housing occupants of the vehicle, a frame carrying said floor, a supporting member for said side and top walls extending upwardly from the location of said floor and including uprights at the opposite sides of said body adjacent said side walls and a base directly beneath said top wall, and a strip extending longitudinally of said body, said base including a downwardly shaped portion of width substantially less than the width of said vehicle, said strip having a portion thereof curvilinear in cross-section fitted to and supported by said downwardly shaped portion, and said top wall having a portion thereof fitted to and suupported by said curvilinear portion to provide an air passageway extending longitudinally of the top wall at the outer side of the vehicle and of width substantially less than the width of said vehicle.

6. In an automotive vehicle, a body including a floor, side walls and a top wall for housing occupants of the vehicle, a frame carrying said floor, a supporting member for said side and top walls extending upwardly from the location of said floor and including uprights at the opposite sides of said body connected with said side walls and a base beneath said top wall and connected therewith, said side walls merging into said top wall, and a metallic strip extending longitudinally of said body at the midwidth thereof, said base including a downwardly shaped portion at its midlength and of width substantially less than the width of said vehicle, said metallic strip being connected to and supported by said base and having a curvilinear portion thereof fitted to said downwardly shaped portion, said top wall being connected to and supported by said base, and a portion of said top wall being fitted to said curvilinear portion to provide an air passageway extending longitudinally of the vehicle and of width substantially less than the width of said vehicle, said air passageway being at the midwidth of the vehicle and at its upper, outer side.

NELS H. NELSON.